US012759783B2

(12) United States Patent
Doucet et al.

(10) Patent No.: US 12,759,783 B2
(45) Date of Patent: Oct. 13, 2026

(54) SELF-DESTRUCTIVE DISPENSER FOR CONTROLLED SUBSTANCES

(71) Applicant: LOCKEDBRANDS, LLC, Rockwall, TX (US)

(72) Inventors: Grace Elizabeth Doucet, Rockwall, TX (US); Elizabeth Adeola Adebayo, Rockwall, TX (US); Iqra Manahil Tariq, Rockwall, TX (US); Chiragh Naushad Lakhani, Rockwall, TX (US)

(73) Assignee: LOCKEDBRANDS, LLC, Rockwall, TX (US)

( * ) Notice: Subject to any disclaimer, the term of this patent is extended or adjusted under 35 U.S.C. 154(b) by 615 days.

(21) Appl. No.: 18/309,087

(22) Filed: Apr. 28, 2023

(65) Prior Publication Data

US 2023/0346647 A1 Nov. 2, 2023

Related U.S. Application Data

(60) Provisional application No. 63/363,896, filed on Apr. 29, 2022.

(51) Int. Cl.
*B65D 83/04* (2006.01)
*A61J 1/00* (2023.01)

(52) U.S. Cl.
CPC ............ *B65D 83/0454* (2013.01); *A61J 1/00* (2013.01); *A61J 2200/70* (2013.01); *B65D 2583/049* (2013.01)

(58) Field of Classification Search
CPC .. B65D 83/0454; B65D 2583/049; A61J 1/00; A61J 2200/70
USPC .......... 221/2
See application file for complete search history.

(56) References Cited

U.S. PATENT DOCUMENTS

| | | | | | | |
|---|---|---|---|---|---|---|
| 3,785,525 | A | * | 1/1974 | Handeland | B65G 47/1471 | 221/265 |
| 3,927,484 | A | * | 12/1975 | Spiegel | B65D 25/36 | 40/306 |
| 4,150,766 | A | * | 4/1979 | Westendorf | B65D 83/0409 | 221/265 |
| 4,273,254 | A | * | 6/1981 | Cupplediteh | B65D 83/0409 | 221/265 |
| 4,428,709 | A | * | 1/1984 | Peters | B65B 69/0058 | 414/412 |
| 4,518,828 | A | * | 5/1985 | Geboers | H04M 19/08 | 379/361 |
| 4,560,086 | A | * | 12/1985 | Stol | G07F 11/44 | D20/3 |
| 4,572,403 | A | * | 2/1986 | Benaroya | A61J 7/04 | 221/76 |
| 4,611,727 | A | * | 9/1986 | Graff | B65D 83/0409 | 221/265 |
| 4,755,405 | A | * | 7/1988 | Massucco | B65D 23/02 | 215/901 |

(Continued)

*Primary Examiner* — Rakesh Kumar
(74) *Attorney, Agent, or Firm* — KLEMCHUK PLLC

(57) ABSTRACT

A dispenser for one or more units of a controlled substance is configured to hold the units of the controlled substance, an adhesive, and a neutralizing agent. The dispenser is configured to perform a method that includes: upon occurrence of a triggering condition, i) crushing the units of the controlled substance, ii) pushing or releasing the adhesive around the crushed units of the controlled substance, and iii) pushing or releasing the neutralizing agent inside and/or outside of the dispenser.

22 Claims, 5 Drawing Sheets

(56) References Cited

U.S. PATENT DOCUMENTS 4,816,305 A * 3/1989 Stillwell .............. B65D 1/0215 428/36.6
5,110,008 A * 5/1992 Moulding, Jr. ..... G07F 17/0092 221/268
5,176,290 A * 1/1993 Schwarzli ............... G07F 11/44 221/265
5,269,413 A * 12/1993 Stern ...................... B65D 83/04 206/811
5,476,181 A * 12/1995 Seidler .................. G01F 11/286 215/208
6,087,548 A * 7/2000 Levy ......................... A61L 2/26 422/26
6,507,275 B2 * 1/2003 Romano ................ G08B 21/24 368/10
7,139,639 B2 * 11/2006 Broussard ............... G07F 11/62 221/9
7,213,723 B2 * 5/2007 Schwarzli ............... G07F 11/44 221/217
7,219,665 B1 * 5/2007 Braithwaite ...... A61M 15/0048 128/203.19
7,249,687 B2 * 7/2007 Anderson ......... A61M 15/0043 221/3
8,408,208 B2 * 4/2013 Bacon ................. A61M 15/008 128/200.14
8,490,795 B2 * 7/2013 Ziemba ..................... B65B 3/04 215/231
8,511,304 B2 * 8/2013 Anderson ......... A61M 15/0068 128/200.14
10,369,305 B2 * 8/2019 Li ..................... A61M 15/0045
10,596,071 B1 * 3/2020 Song .......................... A61J 1/03
11,771,693 B2 * 10/2023 Lorio .................... A61J 1/1437 604/890.1
2002/0153005 A1 * 10/2002 Scarrott ................ G06M 1/041 128/200.14
2005/0279760 A1 * 12/2005 Yao ......................... G07F 11/24 221/265
2009/0281657 A1 * 11/2009 Gak .................... G07F 17/0092 700/242
2010/0100237 A1 * 4/2010 Ratnakar ............... A61J 7/0418 221/97
2011/0215021 A1 * 9/2011 Ziemba ................... B65B 53/02 53/442
2011/0226817 A1 * 9/2011 Ortenzi ..................... A61J 1/18 222/424.5
2014/0241838 A1 * 8/2014 Beck ................... B65B 69/0058 414/412
2014/0346063 A1 * 11/2014 Woolf .................... B65D 25/08 206/219
2015/0160186 A1 * 6/2015 Garner-Richards ......................... A61B 5/150503 221/270
2016/0328535 A1 * 11/2016 Barr ...................... A61J 7/0472
2017/0079887 A1 * 3/2017 Song ..................... A61J 7/0418
2018/0028406 A1 * 2/2018 Patton ................... A61J 7/0069
2018/0147180 A1 * 5/2018 Allphin ................ A61K 31/485
2020/0353179 A1 * 11/2020 Lorio .................... A61J 1/1437
2021/0046014 A1 * 2/2021 Patel .................... A61K 9/2009
2023/0346647 A1 * 11/2023 Doucet ................. A61J 7/0454

* cited by examiner

SELF-DESTRUCTIVE DISPENSER FOR CONTROLLED SUBSTANCES

CROSS-REFERENCE TO RELATED APPLICATION

This application is a non-provisional patent application claiming the benefit of, and priority to, U.S. Provisional Patent Application No. 63/363,896, filed Apr. 29, 2022, which is incorporated by reference herein in its entirety.

FIELD OF THE DISCLOSURE

The present disclosure generally relates to dispensers for controlled substances and methods of destroying controlled substances in a dispenser.

BACKGROUND

Controlled substances such as opioids can be prescribed to patients for various reasons, such as for pain relief. It is assumed patients will follow the recommended dosage amounts and times and safely dispose of any left-over medication. Unfortunately, the reality is these drugs are not disposed of properly. For example, from the 142 million opioid prescriptions given, approximately 30% of those patients will misuse their prescription. Unsecured prescription bottles allow access to the controlled substance anytime, which contributes to abuse, overdose, or unauthorized sale of the controlled substance.

Dispensers for controlled substances are generally not manufactured to address these problems. For example, pill holders are generally configured to hold pills of the controlled substance but do not control access to the controlled substance. Automated dispensers can have a security mechanism such as a lock, key, or code entry that is required to access a dose of the controlled substance. Devices called pill destroyers can utilize mechanical devices to crush the pill; however, the crushed controlled substance can still be accessed and consumed.

There is a need for a dispenser of controlled substances that, if tampered with, can self-destruct and render the controlled substance therein non-consumable.

SUMMARY

In some aspects, the techniques described herein relate to a method for rendering one or more units of a controlled substance contained in a dispenser non-consumable, the method including: detecting, by a control circuit of the dispenser, a trigger condition; and based upon the detecting, i) crushing, by the dispenser, the one or more units of the controlled substance inside the dispenser, ii) pushing or releasing, by the dispenser, an adhesive from an adhesive container inside the dispenser to cover at least a portion of the crushed units of the controlled substance inside the dispenser, and iii) pushing or releasing, by the dispenser, a neutralizing agent from an agent container inside the dispenser to an interior of the dispenser, to an outside of the dispenser, or both to the interior and to the outside of the dispenser.

In some aspects, the techniques described herein relate to a dispenser configured to render one or more units of a controlled substance contained therein non-consumable, wherein the dispenser includes: a housing; a first plate contained in the housing; a plurality of teeth connected to the first plate; a ring member contained in the housing and having a plurality of compartments; a second plate, wherein the ring member is positioned between the first plate and the second plate, wherein each of the plurality of teeth is configured to fit within one of the plurality of compartments, wherein each of the one or more units of the controlled substance is in one of the plurality of compartments.

BRIEF DESCRIPTION OF THE DRAWINGS

For a more complete understanding of this disclosure, reference is now made to the following description, taken in conjunction with the accompanying drawings, in which.

DETAILED DESCRIPTION

Disclosed is a method of destroying a controlled substance in a dispenser and a self-destructing dispenser of a controlled substance. With the methods and dispenser configurations disclosed herein, all units of a controlled substance contained in the dispenser can be rendered non-consumable upon occurrence of a trigger condition.

The dispenser is configured to store units (e.g., pills, capsules, vials, or combinations thereof) of a controlled substance. The dispenser is configured to dispense units of controlled substance one at a time, in a controlled manner such as a pre-programmed timer that dispenses units at predetermined intervals of time. The user of the dispenser cannot manipulate the timing of unit release or access any controlled substance units that are held in the dispenser. Moreover, if the dispenser is tampered, the method and dispenser can automatically destroy the controlled substance units upon occurrence of a trigger condition. The destruction uses swift-acting mechanical forces inside the dispenser to crush the controlled substance units, along with immediate release of chemical substances inside and outside the dispenser that are non-harmful and non-toxic to humans, but that render the destroyed units of controlled substance non-consumable and to render the dispenser unusable as proof that the user tampered with the dispenser. The dispenser is configured with universally-sized controlled substance unit compartments to hold all types and forms of controlled substance units. The dispenser containing the units of controlled substance is portable and light-weight, for example, weighing less than 5 pounds.

Figure 1:
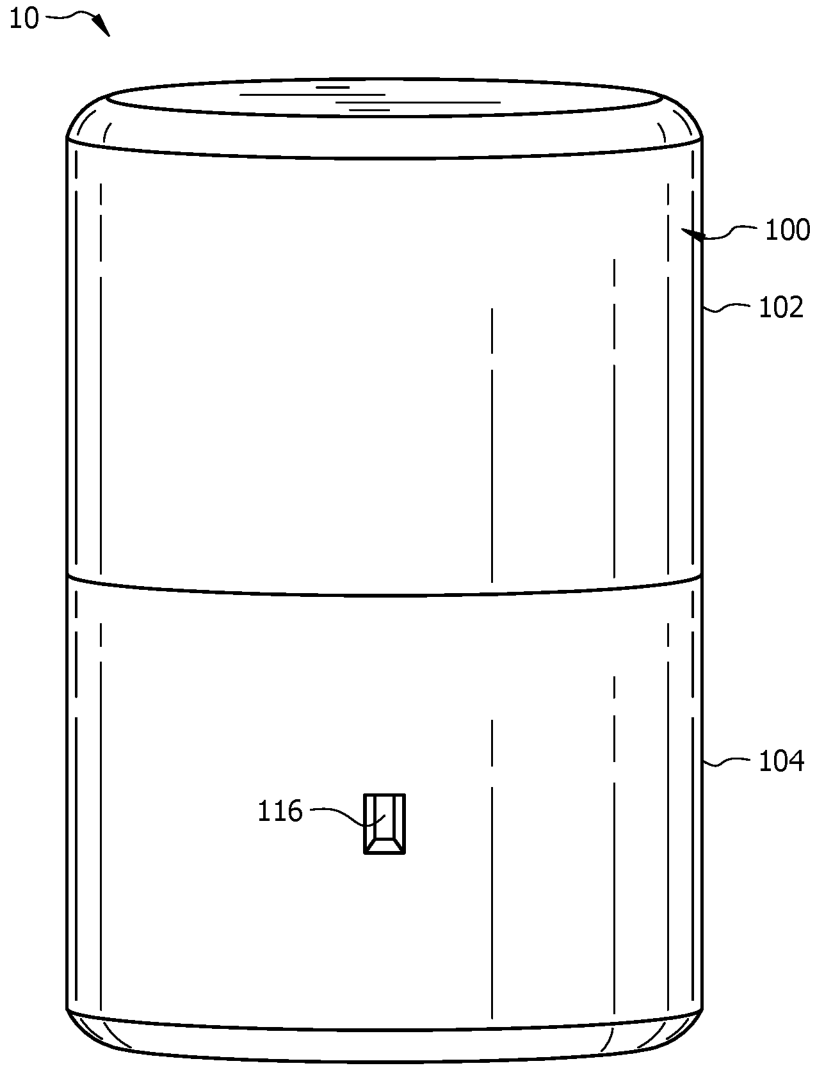
FIG. 1 illustrates a side perspective view of the disclosed dispenser.

FIG. 1 illustrates a side perspective view of the disclosed dispenser 10. The dispenser 10 has housing 100, and the housing 100 can be made of multiple portions that fit together to make the housing 100. For example, the housing 100 can have a first portion 102 and a second portion 104. While the first portion 102 is illustrated as being a top portion and the second portion 104 is illustrated as being a bottom portion, being top and bottom is a matter of orientation of the dispenser 10, and the first portion 102 can be a top, bottom or side portion, and the second portion 104 can be a bottom, top, or side portion depending on how the dispenser 10 is held or placed on a surface.

An opening 116 for dispensing a unit of the controlled substance is formed in the second portion 104. In aspects, the opening 116 has a size that can allow one unit of a controlled substance to pass therethrough, where the unit can be any form and type of commercially available units. In an aspect, the opening 116 has a height of about 12 mm.

In aspects, the housing 100 can be formed of one or more polymeric materials. For example, the polymeric material can be a polycarbonate polymer configured to withstand (before cracking) at least 2500 N of force. This load tolerance can allow for a housing 100 (e.g., a wall 106 thickness of less than 0.5 or 0.4 inches). In aspects, the housing 100 can be formed of polycarbonate having a tensile strength of 9,500 psi.

The housing 100 can have any shape and dimension. In aspects, the housing 100 can have a cylindrical shape. In aspects, a height of the housing 100 can range from about 4 inches to about 8 inches; alternatively, can range from about 4 inches to about 6 inches; alternatively, can be about 5 inches. In aspects, an inner diameter of the housing 100 can range from about 2.5 inches to about 4 inches; alternatively, from about 2.5 inches to about 3.5; alternatively, 2.5, 2.6, 2.7, 2.8, 2.9, 3.0, 3.1, 3.2, 3.25, 3.3, 3.4, or 3.5. In aspects, an outer diameter of the housing 100 can range from about 3.5 inches to about 4.5 inches; alternatively, from about 3.5 inches to about 4.0 inches; alternatively, about 3.6 or 3.7 inches. In one embodiment, the housing 100 can have a height of about 5.02 inches, an outer diameter of about 3.64 inches, and an inner diameter of about 3.25 inches. In aspects, the first portion 102 and the second portion 104 can have about the same size; alternatively, the first portion 102 can form a majority of the housing 100; alternatively, the second portion 104 can form a majority of the housing 100.

As shown in FIG. 1, only one unit of controlled substance can be exposed to a user of the dispenser 10 at a time. In aspects, no unit of controlled substance can be exposed to the user unless prompted by a timer in the dispenser 10.

Figure 2:
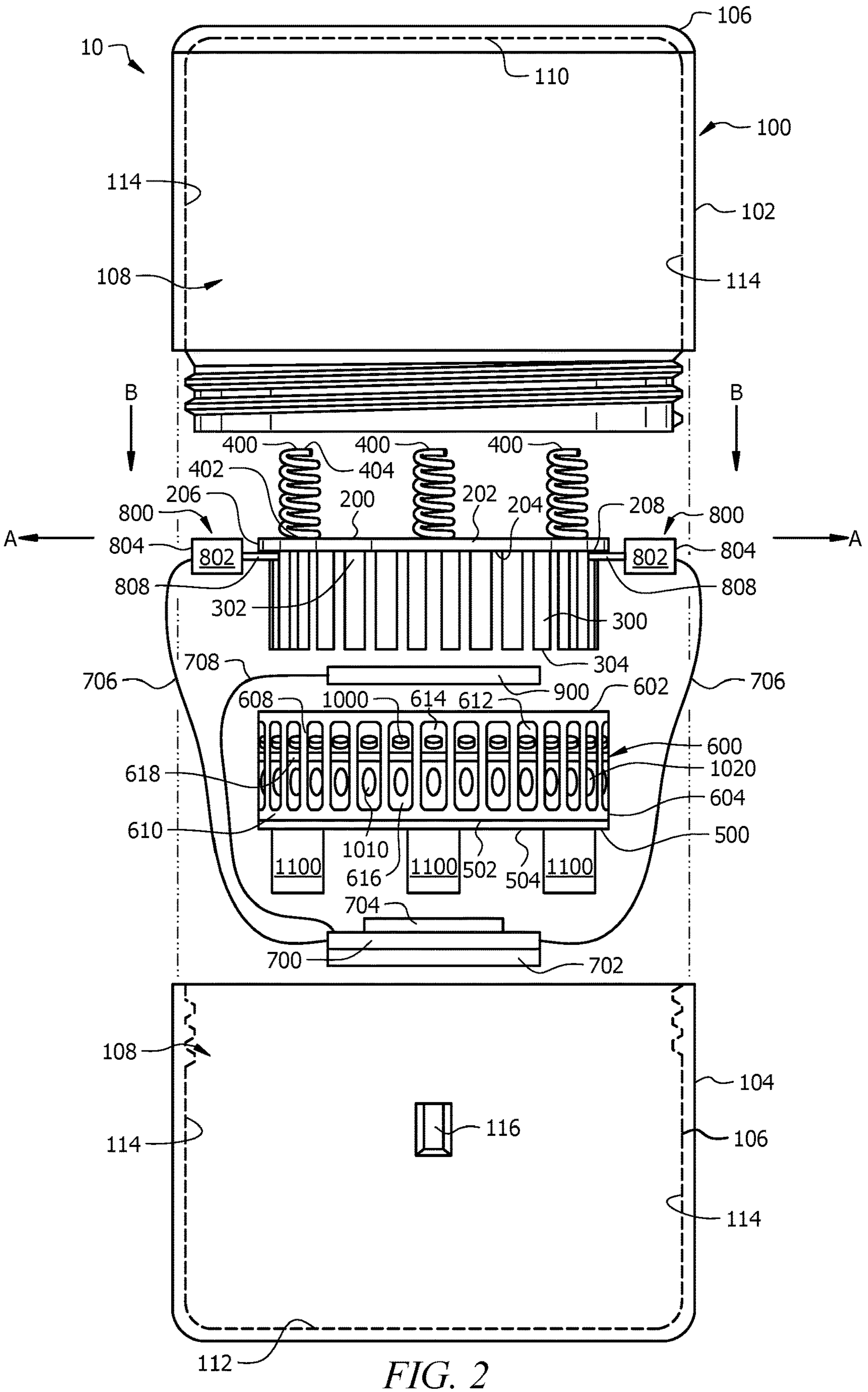
FIG. 2 illustrates an exploded side view of the disclosed dispenser.

FIG. 2 illustrates an exploded side view of the disclosed dispenser 10. The housing 100 of the dispenser 10 has a hollow interior 108 formed by a wall 106 of the dispenser 10. The wall 106 of the dispenser can have any thickness, such as from 0.25 inch to 1 inch in thickness.

Contained within the hollow interior 108 of the housing 100 is a first plate 200, teeth 300 connected to the first plate 200, one or more springs 400 contained in the housing 100 and connected either to the first plate 200 or to the top surface 110 of the housing 100, a second plate 500 contained in the housing 100 and positioned below the first plate 200, a ring member 600 contained in the housing 100 and having compartments 612, and one or more control circuits 700, one or more adhesive containers 1010 comprising an adhesive, one or more agent containers 1020 comprising a neutralizing agent (e.g., vomit-inducing agent), a force sensor 704 configured to sense a trigger condition and contained in the housing 100 and connected to one of the control circuits 700, one or more lever devices 800 connected to a side surface 114 of the housing 100 and configured to hold the spring(s) 400 in a compressed position when the one or more lever devices 800 are in a plate lock position (where each device 800 is connected to another of the control circuits 700), and a motor assembly 900 contained within the housing 100 and connected to the second plate 500 and to the ring member 600.

The first plate 200 is positioned in the housing 100 between the springs 400 and the ring member 600. The first plate 200 can be made of metal (e.g., steel) or polymer (e.g. polycarbonate polymer). In some aspects, the first plate 200 can be attached to one or more springs 400. The first plate 200 can be form-fitted to the second plate 500.

Each of the teeth 300 has an end 302 connected to a bottom surface 204 of the first plate 200. The teeth 300 can be formed of a hard metal, such as steel. Each of the teeth 300 is configured to fit in one compartment of the compartments 612 of the ring member 600. Moreover, the shape or form of each of the teeth 300 is configured to match or complement the shape of the corresponding compartment 612. Each of the teeth 300 is aligned above one of the compartments 612 so that when the springs 400 uncompress and move the first plate 200 in the direction of arrows B, the first plate 200 moves the teeth 300 into the compartments 612.

The springs 400 can be attached to the top surface 110 of the housing 100, to the top surface 202 of the first plate 200, or to both the top surface 110 of the housing 100 and to the top surface 202 of the first plate 200. The springs 400 can be any type of spring such as a coil spring or a hydraulic spring. Each of the springs 400 is configured to have a compressed position and an uncompressed position. Each of the springs 400 is configured to be set in a compressed position within the housing 100, and to move from the compressed position to the uncompressed position when the lever device(s) 800 release the spring(s) 400. The spring then provides spring force to move from a compressed position to an uncompressed position in the housing 100. In coil spring embodiments, the spring 400 can be formed of a suitable material for spring function, such as a metal. In aspects, the springs 400 can provide a total force of 300 to 400 lb-force, e.g., 354 lb-force for some embodiments.

The second plate 500 is contained within the housing 100 and adjacent to the bottom wall 610 of the ring member 600 and connected to the motor of the motor assembly 900. The second plate 500 is not connected or attached to the ring member 600 so that the ring member 600 can rotate on the top surface 502 of the second plate 500 by action of the motor of the motor assembly 900. The second plate 500 can be formed of a hard metal, such as steel. The second plate 500 can be made of metal (e.g., steel) or a polymer (e.g., polylactic acid (PLA)). The second plate 500 can be configured to hold one or more container(s) 1010 of adhesive and optionally one or more contains(s) 1020 of the neutralizing agent, allowing for optimal contact for crushing the controlled substance.

The ring member 600 is positioned between the first plate 200 and the second plate 500, wherein each of the teeth 300 is configured to fit within one of the compartments 612, wherein a unit 1000 of the controlled substance is in each of the compartments 612 of the ring member 600. The ring member 600 can be formed of a hard metal, such as steel.

In FIG. 2, it can be seen that a partition 618 is placed or formed in each compartment 612 of the ring member 600, forming a first portion 614 and a second portion 616 in each compartment 612. The portions 614 and 616 can also be referred to as sub-compartments in each compartment 612; alternatively, the portions 614 and 616 can be referred to as first plurality of compartments and second plurality of compartments.

In the configurations shown in FIG. 2, the first portion 614 is above the second portion 616. In aspects, the first portion 614 contains one unit 1000 of controlled substance, and the second portion 616 contains one container that is an adhesive container 1010 or an agent container 1020. In all aspects, at least one adhesive container 1010 and at least one agent container 1020 is present in the compartments 612 of the ring member 600. The portion 614 (or sub-compartment) of each compartment 612 that is aligned with the opening 116 in the second portion 104 of the housing 100.

In aspects, each partition 618 has one or more connections to the sides of the compartment 612 in a manner that the connection(s) are breakable when the springs 400 move the teeth 300 to crush the units 1000 and release substances from containers 1010 and 1020 in the housing 100.

Each partition 618 can be formed of the same material as the ring member 600, or alternatively, each partition 618 can be formed of a material that is easily destroyed by the force of the springs 400, so that the teeth 300 can crush the units 1000 and also crush the containers 1010 and 1020 so as to release the adhesive and agent from the containers 1010 and 1020.

Each of the control circuits of the control circuit 700 can be embodied as one or more circuit boards having associated electrical components such as silicon base, copper wiring, micro processing unit, capacitors, transistors, and other components known in the electric circuitry arts. The control circuit 700 can at least include a lever control circuit and a motor control circuit. Upon occurrence of a trigger condition, the lever control circuit of the control circuits 700 is configured to detect the trigger condition via wiring 706 with the force sensor 704 and to provide electrical power via wiring 706 to actuate the lever device(s) 800 so as to release the spring(s) 400 from the compressed position. The springs 400 then provide a spring force to move from a compressed position to an uncompressed position in the housing 100. In aspects, the motor control circuit can be configured to provide electrical power via wiring 708 to the motor assembly 900; and in additional aspects, the motor control circuit can include a timer programming to control the supply of electrical power to the motor assembly 900 (in some aspects, the motor assembly 900 includes a timer). Circuitry for the control circuits is commercially available from ARDIUNO®.

In aspects, the first control circuit (the motor control circuit) can be separate from the second control circuit (lever control circuit). The first control circuit is designed for the motor. The first control circuit can be electrically connected to a servo motor which is attached to the motor assembly 900 (e.g., embodied as a puck) that is connected or coupled to the second plate 500 of the dispenser 10. The motor will rotate the ring member 600 upon a predetermined amount of time set to dispense the controlled substance. The second control circuit can be electrically connected to the force sensor(s) 704. The control circuit can be configured determine the trigger condition (e.g., a force of 97 N or more) has occurred, and the control circuit can be configured to actuate the one or more lever devices 800 (that hold the first plate 200 against the springs 400) from a locked position to an unlocked position. When the one or more lever devices 800 move from the locked position to the unlocked position, the first plate 200 is no longer held in the first position by the one or more lever devices 800, and the springs 400 that are attached to the first plate 200 provide force that moves the first plate 200 in the direction of the second plate 500. The movement of the first plate 200 from the first position to the second position crushes the controlled substance in the dispenser 10.

In FIG. 2, each of the lever devices 800 has an actuator 802 and an arm 808 that is connected to the actuator 802. The actuator 802 is configured to move the arm 808 between two positions, herein described as a locked position and an unlocked position. The end 804 of each lever device 800 is connected to the side surface 114 of the housing 100. In the locked position, each arm 808 is configured to have a portion that extends under the edge 208 of the bottom surface 204 of the first plate 200, holding the first plate 200 against the force of the springs 400 in a compressed position. The arm 808 is illustrated as being a straight member; however, it is contemplated that the arm 808 can have any configuration where a portion of the arm 808 extends under the edge 208 of the first plate 200 to hold the first plate 200 as described above. In other aspects, the lever devices 800 can be placed in the first (top) portion 102 of the housing 100, connected to the side surface 114 of the housing 100 above the first plate 200 (e.g., between the first plate 200 and the top surface 110 of the housing 100 next to the first plate 200), where the arm 808 (e.g., a lever) that holds the first plate 200 extends downward to hole the edge 208 on the bottom surface 204 of the first plate 200. Any lever devices suitable for holding the first plate 200 against the compressed springs 400 in the housing 100 can alternative be used.

Each of the lever devices 800 is electrically connected to a lever control circuit of the control circuits 700 by wiring 706. Upon occurrence of a trigger condition that is sensed by force sensor 704, an electrical power supplied by the lever control circuit with wiring 706 actuates the lever devices 800 from the locked position to an unlocked position in direction of arrows A. To move from the locked position (e.g., where a portion of the arm 808 is under and engaged with edge 208 of the first plate 200) to an unlocked position (e.g., where the portion of the arm 808 does not obstruct movement of the first plate 200 in direction of arrows B), the actuator 802 moves the arms 808 in the direction of arrows A. The movement can involve a pulling movement of the arms 808, or pivoting movement of the arms 808, for example, to move the arms 808 from the locked position to the unlocked position.

The motor assembly 900 is contained in the housing 100 and is connected to the top surface 502 of the second plate 540 and to the inner wall 606 of the ring member 600. The motor assembly 900 can contain a motor and a plate mechanically coupled to the motor. The motor assembly 900 can also include a timer and associated electrical circuitry (such as MCU with wireless capability) so that the motor assembly 900 can be programmed wirelessly to turn on and off, e.g., to rotate ring member 600 such that a unit 1000 can be dispensed at a predetermined time interval. In aspects, the motor of the motor assembly 900 can be connected to the inner wall 606 of the ring member 600 and the plate of the motor assembly 900 can be connected to the top surface 502 of the second plate 540; alternatively, the motor of the motor assembly 900 can be connected to the top surface 502 of the second plate 540 and the plate of the motor assembly 900 can be connected to the inner wall 606 of the ring member 600. The motor of the motor assembly 900 can be connected to a motor control circuit of the control circuits 700 via wiring 708.

Upon occurrence of a dispensing condition, the motor assembly 900 is configured to rotate the ring member 600 such that one unit 1000 of the controlled substance faces the opening 116 in the housing 100. The dispensing condition can be completion of a period of time, for example. The motor assembly 900 can include a timer connected to the motor and configured to turn the motor on and off for rotating the ring member 600 within the housing 100 at times appropriate for dispensing a unit 1000 of the controlled substance from the housing 100. In some aspects, a battery can be included in the motor assembly 900 and connected to the motor and/or the timer, for powering the motor of the motor assembly 900.

Each adhesive container 1010 can be embodied as a package, cartridge, capsule, or pouch comprising the adhesive. In aspects, each adhesive container 1010 can be connected to the ring member 600 or placed within one of the compartments 612 of the ring member 600. In aspects, the adhesive can be a quick-setting or quick curing adhesive, configured to set or cure in less than 15 seconds (e.g., a swift drying, industrial-grade adhesive bonding). In some aspects, a first plurality of adhesive containers 1010 can contain a first mixing part and a second plurality of adhesive containers 1010 can contain a second mixing part, where the release of the spring 400 and moving of teeth 300 into the compartments 612 crush the units 1000 and containers 1010 and 1020, such that both mixing parts are released and mix in the housing 100 to form the adhesive around the crushed pieces of the unit 1000. In FIG. 2, adhesive container 1010 are placed in portion 616 of some of the compartments 612 of the ring member 600.

In some aspects, it is contemplated that the adhesive container 1010 can be embodied as one or more syringe placed between the first plate 200 and second plate 500, such that movement of the first plate 200 in direction of arrows B moves the plunger of the syringe when the syringe is pressed again the second plate 500.

Each agent container 1020 can be embodied as a package, cartridge, capsule, or pouch comprising the neutralizing agent. In aspects, each agent container 1020 can be connected to the ring member 600 or placed within one of the compartments 612 of the ring member 600. In aspects, the neutralizing agent is a vomit-inducing agent in liquid phase. In some embodiments, the neutralizing agent can include an emetic nut powder. In FIG. 2, agent containers 1020 are placed in portion 616 of some of the compartments 612 of the ring member 600.

In aspects, the first plate 200 and/or the second plate 500 can be lined with containers 1010 and/or 1020. Upon occurrence of the trigger condition, the force causing the first plate 200 to move to the second position can also be sufficient to rupture the containers 1010 and/or 1020.

The dispenser 10 can optionally include pillars 1100. The pillars 1100 can be connected to the bottom surface 504 of the second plate 500. The pillars 1100 are positioned between the bottom surface 504 of the second plate 500 and a bottom surface 112 of the housing 100. The pillars 1100 can be of any cross-sectional shape such as circular, square, or triangular. The pillars 1100 can be formed of a hard metal, such as steel for example. The pillars 1100 can have any height configured to hold the portions 614 of compartments 612 of the ring member 600 at the same height in the housing 100 as the opening 116.

To dispense the units, e.g., in a dispensing mode, the ring member 600 can be rotated by the motor of the motor assembly 900 when prompted by a timer of the motor assembly 900 (alternatively, the timer can be located in the motor control circuit of circuits 700). The timer can be set by a person that prepares the dispenser 10, such as a pharmacist as needed for the prescription, for example.

While in a dispensing mode, the first plate 200 holds the springs 400 in a compressed position when the first plate 200 is in the first position and where the first plate 200 is held in the first position by the one or more lever devices 800.

To destroy the units, the first and second plates 200 and 500 and ring member 600 can be used to hold the units 1000 in place inside the housing 100 of the dispenser 10 so that the ring member 600 cannot rotate. The first plate 200 can be attached to compressed springs 400. Once the force sensor(s) 704 detects a trigger condition (e.g., 97 Newtons of force), one or more lever devices 800 holding the first plate 200 in the housing 100 can release the first plate 200 from a first position. The compressed springs provide a force against the first plate 200 that moves the first plate 200 in a direction of arrows B to a second position (toward the ring member 600 and second plate 500) that is configured to crush the units 1000 of controlled substance that are contained in the ring member 600 between the first plate 200 and the second plate 500. In aspects, the crush force against the units 1000 of controlled substance can be about 354 psi.

To additionally render the crushed controlled substance non-consumable, the first plate 200, the second plate 500, or both the first plate 200 and second plate 500 can include one or more adhesive containers 1010 attached thereto.

Upon occurrence of the trigger condition, the force causing the first plate 200 to move to the second position can also be sufficient to rupture containers 1010 of adhesive. The adhesive can flow into the portion of the dispenser 10 containing the crushed controlled substance. In aspects, the adhesive can cure, harden, bond, dry, or combinations thereof. In aspects, the adhesive can cure, harden, bond, dry, or combinations thereof in less 30, 25, 20, 15, 10, or 5 seconds. In aspects, the adhesive can bond the first plate 200 to the second plate 500 with the crushed controlled substance and ring member 600 contained within the adhesive, making the two steel plates 200 and 500, ring member 600, and adhesive a single bulk of material. In some embodiments, the adhesive can have two parts, where each part is separately encapsulated in a gelatin capsule. The two parts mix when released from the capsules after being compressed by the teeth 300 in the compartments 612 of the ring member 600.

Dispensing the controlled substance involves the use of electrical components contained within the housing 100, including the motor assembly 900 (e.g., that includes a timer and a battery). The electrical components are contained within the housing 100 and are configured to: rotate the ring member 600 that holds the units 1000 and activate the destruction upon occurrence of the trigger condition (e.g., a 97N force threshold being reached). In some embodiments, the electrical components are contained in two control circuits 700, both control circuits 700 utilizing Arduino Pro Minis. The first control circuit (e.g., the motor control circuit) of the control circuits 700 can be attached to a servo motor in the motor assembly 900 which moves on a set timer; the second control circuit (e.g., the lever control circuit) of the control circuits 700 can be operatively connected to i) one or more force sensors 704 that sense a trigger condition (e.g., a force threshold) and ii) one or more lever devices 800 that are actuated by the lever control circuit if the trigger condition (e.g., force threshold) on the force sensors 704 is reached or exceeded. In aspects, one or more battery 702 can be connected to the control circuits 700.

The battery 702 can be an internal carbon battery having an expected life in a range of from about 3 to about 5 years.

In FIG. 2, the force sensor 704 is shown on top of the circuits 700; however, the force sensor 704 can be placed anywhere in the housing 100, such as i) on the top surface 110, on the bottom surface 112, or on the side surface 114 of the housing 100, ii) on the top surface 202 or the bottom surface 204 of the first plate 200, iii) on the top surface 502 or the bottom surface 504 of the second plate 500, iv) on one or more of the pillars 1100, or v) combinations thereof. Moreover, multiple force sensors in addition to force sensor 704 can be included in the dispenser 10 and electrically coupled to the lever control circuit of circuits 700 via wiring 706, where any of the multiple force sensors can be placed anywhere in the housing 100, such as i) on the top surface 110, on the bottom surface 112, or on the side surface 114 of the housing 100, ii) on the top surface 202 or the bottom surface 204 of the first plate 200, iii) on the top surface 502 or the bottom surface 504 of the second plate 500, iv) on one or more of the pillars 1100, or v) combinations thereof.

In operation, upon occurrence of the trigger condition, the lever devices 800 are actuated so as to move the arms 808 from the edge 208 of the first plate 200, and the force of the compressed springs 400 moves the first plate 200 in the direction of arrows B toward the second plate 500, such that the teeth 300 moving into the compartments 612 of the ring member 600 and contact the units 1000 of controlled substance, thus crushing the units 1000 of controlled substance in the first portions 614 (or first plurality of sub-compartments or first plurality of compartments) in the compartments 612 of the ring member 600. The force of the uncompressing springs 400 continues to move the first plate 200 in direction of arrows B toward the second plate 500, with the teeth 300 pushing the crushed units 1000 against the baffles or partitions 618 and breaking the attachment of the baffles or partitions 618 with the side walls of the compartments 612, continuing to move in the direction of arrows B, with the teeth 300 pushing the crushed units 1000 and the baffles or partitions 618 against the container(s) 1010 and optionally container(s) 1020 in the second portions 616 (or second plurality of sub-compartments or second plurality of compartments) in the compartments 612 of the ring member 600, squeezing the adhesive and optionally neutralizing agent out of the containers 1010 and 1020 that are in the second portions 616 in the compartments 612 of the ring member 600.

Upon sensing the trigger condition by the force sensor(s) 704, the lever control circuit of the circuits 700 of the dispenser 10 (connected to the force sensor(s) 704 and to one or more lever devices 800) is configured to detect the sensed trigger condition and to actuate the one or more lever devices 800 from the locked position (holding the first plate 200 against the springs 400) to an unlocked position (allowing the first plate 200 to move in response to force of springs 400 being released), allowing the springs 400 to decompress, moving the first plate 200 from the first position in the direction of arrows B to the second position (in the direction of the second plate 500). Upon the two plates 200 and 500 being compressed together, the units 1000 are crushed and adhesive is released from containers 1010, causing flow of the adhesive between the plates 200 and 500 and around the crushed controlled substance. The springs 400 can continue keeping force on the plate 200 for the adhesion to effectively occur. In embodiments having the neutralizing agent, and upon the two plates 200 and 500 being compressed together, the neutralizing agent will be released, causing flow of the neutralizing agent into the housing 100 and in some cases out of the housing 100 through the opening 116 (if the opening is not blocked by crushed controlled substances and/or adhesive.

The lever device(s) 800 can keep the springs 400 in a compressed position until the force sensor 704 senses the trigger condition that causes the lever device 800 to actuate that releases the first plate 200 from the first position to a second position (and the springs 400 from the compressed position to an uncompressed position). Upon the spring release, the first plate 200 can move from the top portion 102 of the housing 100 to the bottom portion 104 of the housing 100, the bottom portion 104 of the housing 100 containing the ring member 600 and the second plate 500. This rapid and powerful compression force provided by springs 400 can crush the controlled substance, the adhesive containers 1010, and any optionally included agent containers 1020. The springs 400 in uncompressed position keep the two plates 200 and 500, ring member 600, crushed controlled substance units 1000, and adhesive in place due to the adhesive bond and also due to the force of compression from the springs 400 (e.g., and the support from the pillars 1100 that support the second plate in the housing 100).

The springs 400 hold the plates 200 and 500 to lock the crushed units 1000 in place and to contain the crushed pieces of units 1000. The adhesive can bond the plates 200 and 500 together (via the ring member 600 and crushed units 1000 in between the plates 200 and 500, preventing the user from separating the plates 200 and 500 after the units 1000 are crushed. The neutralizing agent (e.g., vomiting-inducing agent) is an added precaution taken in the rare case of a malfunction of the dispenser 10. If a malfunction does occur, use of vomit-inducing agent can cause instantaneous regurgitation of any consumed controlled substance. Although this dispenser 10 does not destroy the controlled substance completely, it does render the units 1000 of controlled substance inaccessible, and coverage of adhesive around the crushed units 1000 makes the units 1000 non-consumable.

Figure 3A:
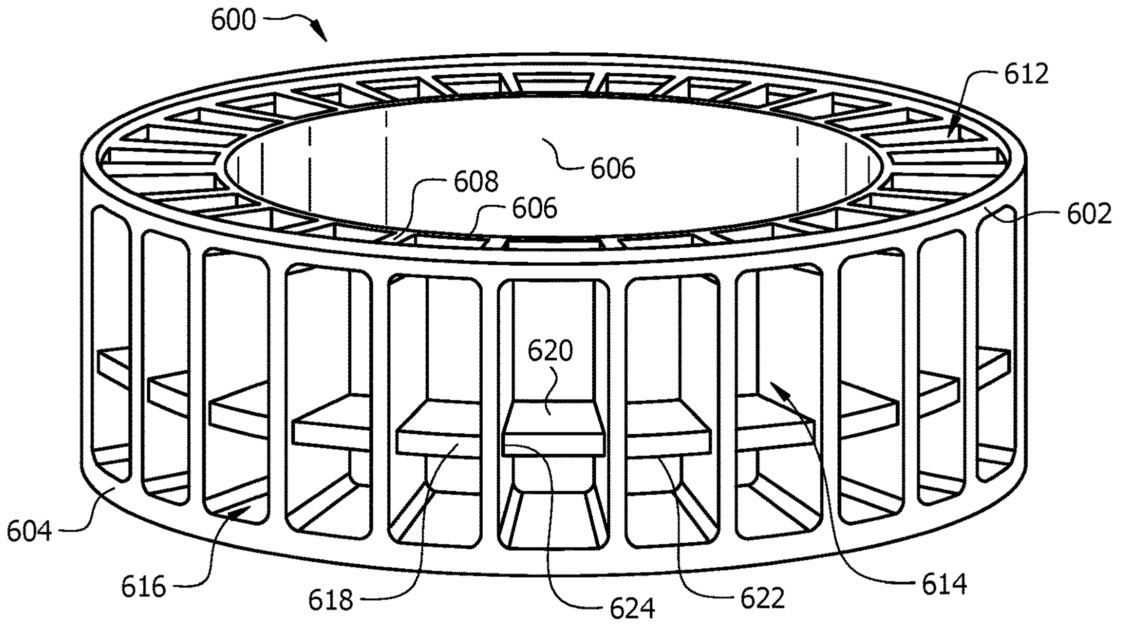
FIG. 3A illustrates a side perspective view of the ring member of the dispenser.
Figure 3B:
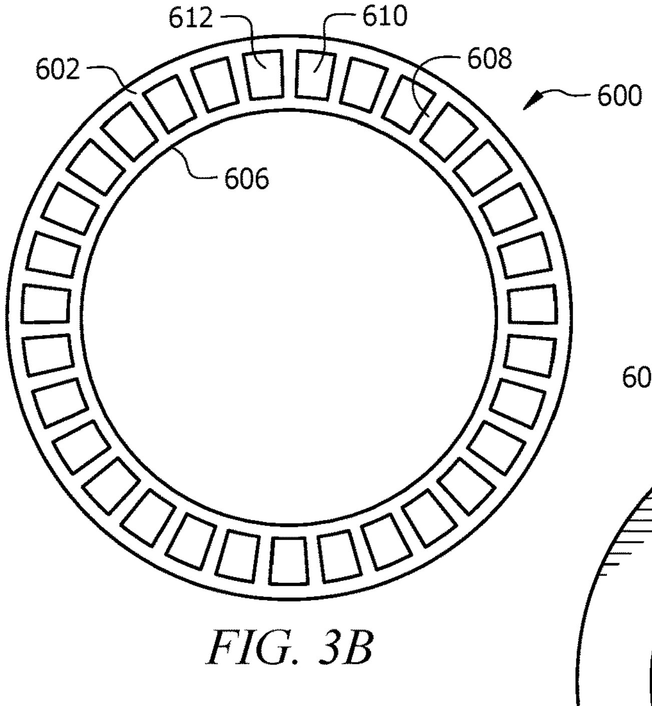
FIG. 3B illustrates a top view of the ring member.
Figure 3C:
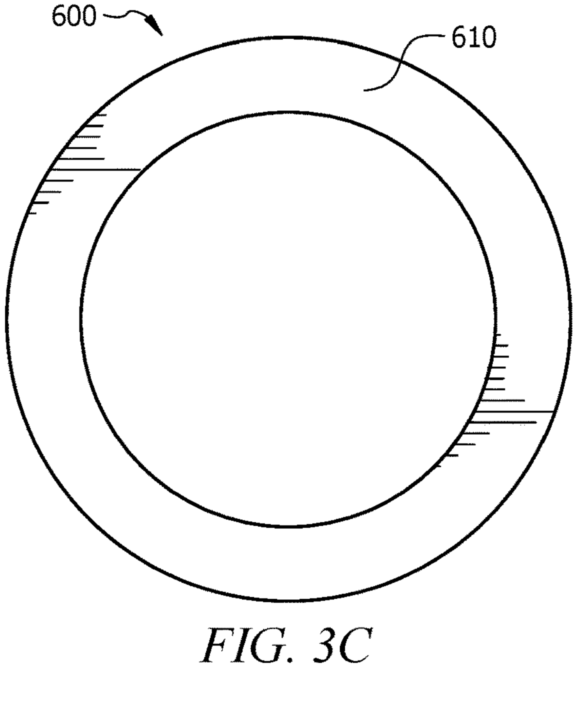
FIG. 3C illustrates a bottom view of the ring member.

FIG. 3A illustrates a side perspective view of the ring member 600 of the dispenser 10. FIG. 3B illustrates a top view of the ring member 600. FIG. 3C illustrates a bottom view of the ring member 600. The ring member 600 is an annular piece with compartments 612 formed therein.

Each compartment 612 is defined by a portion of the inner wall 606, two radial walls 608, a portion of the bottom wall 610. The partitions 618 can be seen in the compartments 612. The top 620 of each partition 618 faces the first portion 614 of the compartment 612, and the bottom 622 of each partition 618 faces the second portion 616 of the compartment 612. The sides 624 of each partition 618 can have one or more portions connected to or in friction-fit relationship with the corresponding radial walls 608 and/or the corresponding portion of the inner wall 606. The baffles or partitions 618 can be attached to the radial walls 608 of the respective compartment 612 such that the attachment breaks when the teeth 300 push against the baffles or partitions 618. The first portions 614 are configured at a height in the housing 100 to align with the location of the opening 116 in the housing 100 for dispensing a unit 1000 of the controlled substance.

A first (top) ring 602 and a second (bottom) ring 604 can be connected to outer facing ends of the radial walls 608 to add stability to the radial walls 608. In aspects, the second ring 604 is part of the bottom wall 610.

The number of compartments 612 in the ring member 600 can be any number, as long as the number of compartments 612 corresponds to the number of teeth 300. The compartments 612 are generally formed around a perimeter of the ring member 600. Each of the first portions 614 of the compartments 612 is configured to hold a unit 1000 of a controlled substance. For example, each of the first portions 614 of the compartments 612 of the ring member 600 of the dispenser 10 can be configured to hold any Class 2 narcotic, 6 mm to 12 mm diameter pill. In various aspects, the ring member 60 can be configured with compartments to hold 10, 20, 30, 40, 50, 60, 70, 80, or 90 individual units 1000 of the controlled substance. The ring member 60 has a second portions 616 of compartments 612 formed around the perimeter of the ring member 600, each of the second portions 616 of the compartments 612 configured to hold a container 1010 or 1020.

In aspects, each compartment 612 can have an inner width (next to the inner wall 606) of 0.23 inches and an outer width (next to the rings 602, 604) of 0.29 inches. The outer diameter of the ring member 600 can be 3.27 inches. A radial distance between the inner wall 606 and the rings 602, 604 can be in a range of from about 0.15 inch to 0.25 inch. A height of the ring member 600 can be about 0.8 inch. A thickness of the bottom wall 610 can be about 0.1 inch.

As can be seen in FIG. 3C, the bottom wall 610 is a solid annular piece with no holes. The bottom wall 610 forms the base of the ring member 600.

Figure 4A:
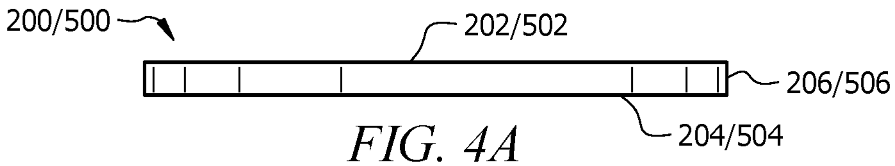
FIG. 4A illustrates a side view of the first plate or second plate.
Figure 4B:
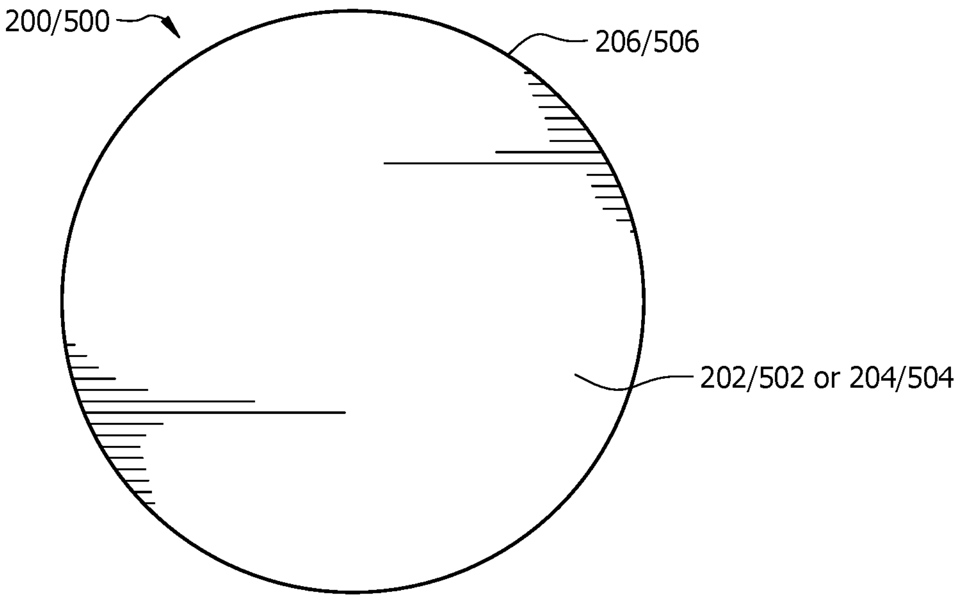
FIG. 4B illustrates a plan view of the first plate or second plate.

FIG. 4A illustrates a side view of the first plate 200 or second plate 500. FIG. 4B illustrates a plan view of the first plate 200 or second plate 500. Each of the plates 200/500 has a top surface 202/502, a bottom surface 204/504, and sides 206/506. As can be seen between the views of FIG. 4A and FIG. 4B, the first plate 200 and the second plate 500 are discs. The outer diameter of the plates 200/500 can be in a range of from 3 to 3.5 inches; alternatively, from 3.1 to 3.3 inches; alternatively, about 3.2 inches. A thickness of the plates 200/500 can be in a range of from 0.1 inch to about 0.25 inch; alternatively, about 0.1 inch, for example. In alternative aspects, the second plate 500 can have an annular shape that matches the cross-section of the ring member 600.

Figure 5A:
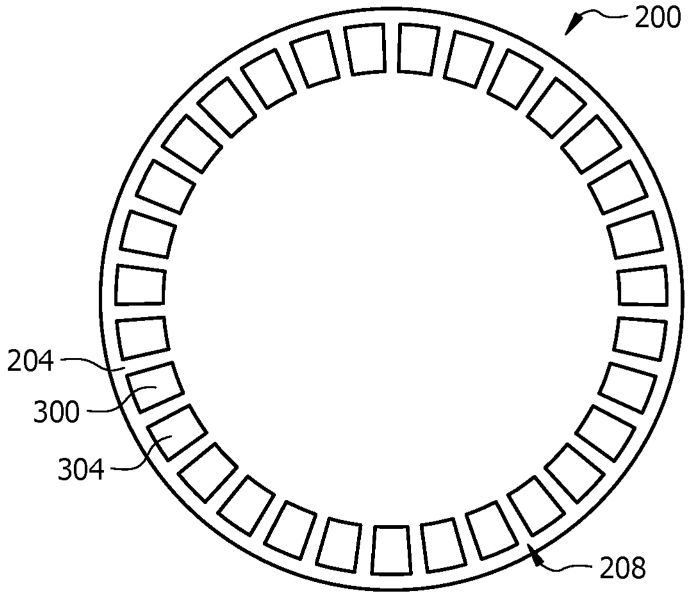
FIG. 5A illustrates a bottom view of the first plate, with teeth attached to the bottom surface of the first plate.

FIG. 5A illustrates a bottom view of the first plate 200, with teeth 300 attached to the bottom surface 204 of the first plate 200. As can be seen, the first plate 200 is a flat disc (e.g., circular sheet of material) with teeth 300 connected along a periphery on the bottom surface 204 of the first plate 200. Each of the teeth 300 extends perpendicularly with respect to a diameter of the first plate 200. The opposite end 304 of each of the teeth 300 faces the compartments 612 of the ring member 600. An outer side 306 of each of the teeth 300 can be placed so that the teeth 300 do not cover the edge 208 of the first plate 200. The edge 208 is clear from the teeth 300 so that a portion of the arm 808 of the lever device(s) 800 can engage with the edge 208 to keep the first plate 200 in place against compressed springs 400. A radial distance of each of the teeth 300 can be bout 0.27 inches. The space between each pair of the teeth 330 can be about 0.08 inch. Each of the teeth 300 can have a height as measured from end 302 to opposite end 304 of about 0.5 to 1 inch; alternatively, about 0.9 inch.

Figure 5B:
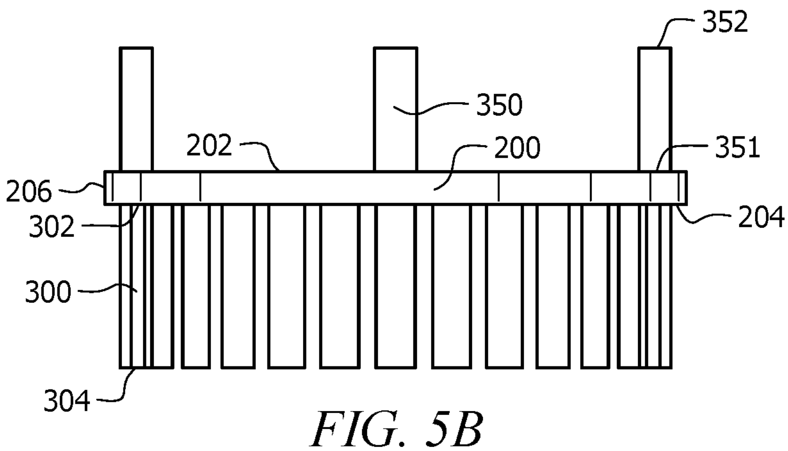
FIG. 5B illustrates a side view of the first plate, with spring guides attached to the top surface of the first plate.

FIG. 5B illustrates a side view of the first plate 200, with spring guides 350 attached to the top surface 202 of the first plate 200. Spring guides 350 are optional in the dispenser 10. Each spring guide 350 can have an end 351 attached to the top surface 202 of the first plate 200. An opposite end 352 of each spring guide 350 can extend into the interior of the compressed springs 400 (when embodied as coil springs); however, a height of the spring guides 350 is less than a height of the springs 400 in the compressed position. The number of spring guides 350 matches the number of springs 400. Spring guides 350 can be formed of a hard metal such as steel, for added strength and guidance of the spring force in the direction of arrows B (in FIG. 2).

COMPRESSION EXAMPLES

Top-load compressive testing was used to assure the force the sensor trigger at 97 N, to determine the limits of stress the entire dispenser can withstand before failing, and to determine the force needed to crush a pill. The process is as follows:

Example 1: Compression Testing on Pill Composition

Place one Claritin pill onto the Trapezium compression machine on the flat side and begin the compression until the machine detects a failure point. Analyzed the failure force of the pill and recorded the data. Repeat step 1 and two three times to calculate the average force the Claritin failed at.

Example 2: Compression Testing on Polycarbonate Housing

Place the housing onto the Trapezium compression machine standing vertically and begin the compression until the machine detected a failure point. Repeat step one and two three times to calculate the average maximum force the housing could withstand. Carry out steps one through three with the housing laying horizontally.

Example 3: Compression Testing on Force Sensor

Place the dispenser with force sensors onto the Trapezium compression machine standing vertically and begin the compression to 97 N. Repeat step one and two three times to determine that the force sensors are functional. Carry out steps one through three with the dispenser laying horizontally.

ADHESIVE EXAMPLES

Testing was done to ensure that the adhesion will combine the two plates effectively and to see the duration of time that the adhesion capsules are viable. The process is as follows:

Example 4: Adhesion Testing

Place the adhesion capsules on the bottom plate. Swiftly and strongly compress the top plate into the bottom plate. Keep constant force and record the time of compression. After two minutes check the adhesion by lightly pulling on the top and bottom plates. Repeat step 4 every two minutes, each time pulling slightly harder. Once the plates are too adhered to pull apart, analyze data and record. Repeat step one through 6 five times to determine that the adhesion is effective.

Example 5: Adhesive Capsule Viability Testing

Place the adhesive into the capsule and seal. Repeat five times. Record the date and time of when the capsules are created. After one day visually check all capsules, lightly squeeze, and see if the liquid is moving. Repeat step four every day until tests are complete. If the capsule is viable, complete step four on the remaining capsules. Repeat steps six through seven every three days until the adhesive is no longer viable.

ELECTRICAL COMPONENTS EXAMPLES

Testing was done to ensure the efficiency of the servo motor to dispense the medication.

Example 6: Servo Motor Validation Testing

Battery. Place battery in the appropriate battery box and wire to an LED. Determine that the LED turns on when the red & black wire touch the positive and negative ends of the light respectively. Repeat step two five times to ensure quality.

Arduino Pro Mini 5V & FTDI. Connect the Arduino pro mini to the FTDI using wires. Plug the FTDI into the computer using the appropriate wire. Analyze the light on AMP to ensure quality. Repeat steps one through three five times.

Draft the servo rotation code on Arduino which would rotate the ring member 12 degrees on a 10 second timer. Assemble the same circuit on TinkerCAD utilizing a breadboard and input your created code. Run this code on the Arduino simulator to ensure it works properly. Upload the code to the Arduino Pro Mini using the FTDI & appropriate cable. Create the same circuit from TinkerCAD using a breadboard & keeping the Arduino plugged into the computer. Verify the completed circuit by running the code and testing with 12° turns every 10 seconds for 30 seconds.

DISPENSER OPERATION EXAMPLE

Example 7

Two metal plates were triggered and were moved together with 170 psi of force, bursting the adhesive pouches, adhering the two metal plates together with an adhesive tensile strength of 4250 psi. The adhesive bond grows stronger, both over time, and with the addition of water should the user attempt to wash it away. The top steel latches will drop as the plate releases ensuring proper force remains for optimal adhesion. The outside shell can withstand 2500 Newtons meaning an average hammer strike will be unable to break open the dispenser. Should the dispenser be compromised, with the average human hand strength measuring around 170 psi, these two plates, built to fit perfectly into one another, will be inseparable by grip strength alone and difficult to separate altogether. An internal battery source will not be accessible by the user and will only be available by unlocking the dispenser. Finally, the Ipecac Syrup packets, which also burst on impact, can cause expulsion of any consumed opioids.

ADDITIONAL DESCRIPTION

Clause 1. A method for rendering one or more units 1000 of a controlled substance contained in a dispenser 10 non-consumable, the method comprising: detecting, by a control circuit 700 of the dispenser 10, a trigger condition; and based upon the detecting, i) crushing, by the dispenser 10, the one or more units 1000 of the controlled substance inside the dispenser 10, ii) pushing or releasing, by the dispenser, an adhesive from an adhesive container 1010 inside the dispenser 10 to cover at least a portion of the crushed units 1000 of the controlled substance inside the dispenser 10, and iii) pushing or releasing, by the dispenser 10, a neutralizing agent from an agent container 1020 inside the dispenser 10 to an interior of the dispenser 10, to an outside of the dispenser 10, or both to the interior and to the outside of the dispenser 10.

Clause 2. The method of clause 1, wherein the trigger condition is a force of 97 Newtons or more.

Clause 3. The method of clause 1 or 2, further comprising: sensing the trigger condition by one or more force sensors 704 of the dispenser 10, wherein the one or more force sensors 704 are operably connected to a lever control circuit of control circuits 7000.

Clause 4. The method of any one of clauses 1 to 3, wherein the dispenser 10 comprises a housing 100, a first plate 200 contained in the housing 100, a plurality of teeth 300 connected to the first plate 200, a ring member 600 contained in the housing 100 and having a plurality of compartments 612, and a second plate 200 contained in the housing 100, wherein the ring member 600 is positioned between the first plate 200 and the second plate 500, wherein each of the plurality of teeth 300 is configured to fit within one of the plurality of compartments 612, wherein each of the one or more units 1000 of the controlled substance is in one of the plurality of compartments 612, wherein the method further comprises: prior to the crushing, moving the first plate 200 from a first position to a second position so as to move the plurality of teeth 300 into the plurality of compartments 612 and exert a crushing force on the one or more units 1000 of the controlled substance in the plurality of compartments 612.

Clause 5. The method of any one of clauses 1 to 4, wherein each of the plurality of compartments 612 has a partition 618 that divides the compartment 612 into a first portion 614 and second portion 616 below the first portion 614.

Clause 6. The method of any one of clauses 1 to 5, wherein a unit 1000 of the one or more units 1000 of the controlled substance is contained in the first portion 614, wherein the adhesive, the neutralizing agent, or both the adhesive and the neutralizing agent is contained in the second portion 616.

Clause 7. The method of any one of clauses 1 to 6, wherein a unit 1000 of the one or more units 1000 of the controlled substance is contained in the second portion 616, wherein the adhesive, the neutralizing agent, or both the adhesive and the neutralizing agent is contained in the first portion 614.

Clause 8. method of any one of clauses 1 to 7, wherein the adhesive container 1010 comprises a package, cartridge, capsule, or pouch that is placed in one of the plurality of compartments 612 of the ring member 600.

Clause 9. The method of any one of clauses 1 to 8, wherein the agent container 1020 comprises a package, cartridge, capsule, or pouch that is placed in one of the plurality of compartments 612 of the ring member 600.

Clause 10. The method of any one of clauses 1 to 9, further comprising: after the detecting and prior to the moving, actuating a lever device 800 to release a spring 400 from a compressed position, wherein the spring 400 is positioned between the first plate 200 and a top surface 110 of the dispenser 10, wherein the lever device 800 is connected to a side surface 114 of the dispenser 10.

Clause 11. The method of any one of clauses 1 to 10, wherein the moving of the first plate 200 is caused by a force of the spring 400 moving from the compressed position to an uncompressed position.

Clause 12. The method of any one of clauses 1 to 11, wherein the dispenser 10 further comprises a spring guide

350 connected to the first plate 200, wherein the spring guide 350 is positioned within the spring 400.

Clause 13. The method of any one of clauses 1 to 12, wherein the crushing force is additionally exerted against the adhesive container 1010 and against the agent container 1020.

Clause 14. The method of any one of clauses 1 to 13, wherein the neutralizing agent is a vomiting-inducing compound.

Clause 15. A dispenser 10 configured to render one or more units 1000 of a controlled substance contained therein non-consumable, wherein the dispenser 10 comprises: a housing 100; a first plate 200 contained in the housing 100; a plurality of teeth 300 connected to the first plate 200; a ring member 600 contained in the housing 100 and having a plurality of compartments 612; a second plate 500, wherein the ring member 600 is positioned between the first plate 200 and the second plate 500, wherein each of the plurality of teeth 300 is configured to fit within one of the plurality of compartments 612, wherein each of the one or more units 1000 of the controlled substance is in one of the plurality of compartments 612.

Clause 16. The dispenser of clause 15, further comprising: an adhesive container 1010 comprising an adhesive, wherein the adhesive container is a package, cartridge, capsule, or pouch comprising the adhesive, wherein the adhesive container 1010 is connected to the ring member 600 or placed within one of the plurality of compartments 612; and an agent container 1020 comprising a neutralizing agent, wherein the agent container 1020 is a package, cartridge, capsule, or pouch comprising the neutralizing agent, wherein the agent container 1020 is connected to the ring member or placed within one of the plurality of compartments 612.

Clause 17. The dispenser of clause 15 or 16, further comprising: a force sensor 704 configured to sense a trigger condition and contained in the housing 100; a spring 400 contained in the housing 100; a lever device 800 connected to a side surface 114 of the housing 100 and configured to hold the spring 400 in a compressed position; and a control circuit 700 connected to the force sensor 704 and to the lever device 800, wherein upon occurrence of a trigger condition, the control circuit 700 is configured to detect the trigger condition and actuate the lever device 800 so as to release the spring 400 from the compressed position.

Clause 18. The dispenser of any of clauses 15 to 17, wherein after release of the spring 400 from the compressed position, the spring 400 is configured to exert a crushing force against the first plate 200 so as to move the plurality of teeth 300 into the plurality of compartments 612 and to: i) crush the one or more units 1000 of the controlled substance, ii) push or release the adhesive from the adhesive container 1010 inside the housing to cover at least a portion of the crushed units 1000 of the controlled substance inside the housing 100, and iii) push or release the neutralizing agent from the agent container 1020 inside the housing to an interior of the housing 100, to an outside of the housing 100, or both to the interior and to the outside of the housing 100.

Clause 19. The dispenser of any of clauses 15 to 18, further comprising: a spring guide 350 connected to the first plate 200, wherein the spring guide 350 is positioned within the spring 400.

Clause 20. The dispenser of any of clauses 15 to 19, further comprising: a motor assembly 900 connected to the second plate 500 and to the ring member 600, configured to rotate the ring member 600 to align one of the plurality of compartments 612 with an opening 116 formed in the housing 100.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for rendering one or more units of a controlled substance contained in a dispenser non-consumable, the method comprising:

detecting, by a control circuit of the dispenser, a trigger condition; and based upon the detecting, i) crushing, by the dispenser, the one or more units of the controlled substance inside the dispenser, ii) pushing or releasing, by the dispenser, an adhesive from an adhesive container inside the dispenser to cover at least a portion of the crushed units of the controlled substance inside the dispenser, and iii) pushing or releasing, by the dispenser, a neutralizing agent from an agent container inside the dispenser to an interior of the dispenser, to an outside of the dispenser, or both to the interior and to the outside of the dispenser.

2. The method of claim 1, wherein the trigger condition is a force of 97 Newtons or more.

3. The method of claim 2, further comprising:

sensing the trigger condition by one or more force sensors of the dispenser, wherein the one or more force sensors are operably connected to the control circuit.

4. The method of claim 1, wherein the dispenser comprises a housing, a first plate contained in the housing, a plurality of teeth connected to the first plate, a ring member contained in the housing and having a plurality of compartments, and a second plate contained in the housing, wherein the ring member is positioned between the first plate and the second plate, wherein each of the plurality of teeth is configured to fit within one of the plurality of compartments, wherein each of the one or more units of the controlled substance is in one of the plurality of compartments, wherein the method further comprises:

prior to the crushing, moving the first plate from a first position to a second position so as to move the plurality of teeth into the plurality of compartments and exert a crushing force on the one or more units of the controlled substance in the plurality of compartments.

5. The method of claim 4, wherein each of the plurality of compartments has a partition that divides the compartment into a first portion and second portion below the first portion.

6. The method of claim 5, wherein a unit of the one or more units of the controlled substance is contained in the first portion, wherein the adhesive, the neutralizing agent, or both the adhesive and the neutralizing agent is contained in the second portion.

7. The method of claim 5, wherein a unit of the one or more units of the controlled substance is contained in the second portion, wherein the adhesive, the neutralizing agent, or both the adhesive and the neutralizing agent is contained in the first portion.

8. The method of claim 5, wherein the adhesive container comprises a package, cartridge, capsule, or pouch that is placed in one of the plurality of compartments of the ring member.

9. The method of claim 5, wherein the agent container comprises a package, cartridge, capsule, or pouch that is placed in one of the plurality of compartments of the ring member.

10. The method of claim 4, further comprising:

after the detecting and prior to the moving, actuating a lever device to release a spring from a compressed position, wherein the spring is positioned between the first plate and a top surface of the dispenser, wherein the lever device is connected to a side surface of the dispenser.

11. The method of claim 10, wherein the moving of the first plate is caused by a force of the spring moving from the compressed position to an uncompressed position.

12. The method of claim 10, wherein the dispenser further comprises a spring guide connected to the first plate, wherein the spring guide is positioned within the spring.

13. The method of claim 4, wherein the crushing force is additionally exerted against the adhesive container and against the agent container.

14. The method of claim 1, wherein the neutralizing agent is a vomiting-inducing compound.

15. A dispenser configured to render one or more units of a controlled substance contained therein non-consumable, wherein the dispenser comprises:

a housing;

a first plate contained in the housing;

a plurality of teeth connected to the first plate;

a ring member contained in the housing and having a plurality of compartments;

a second plate, wherein the ring member is positioned between the first plate and the second plate, wherein each of the plurality of teeth is configured to fit within one of the plurality of compartments, wherein each of the one or more units of the controlled substance is in one of the plurality of compartments;

an adhesive container comprising an adhesive, wherein the adhesive container is a package, cartridge, capsule, or pouch comprising the adhesive, wherein the adhesive container is connected to the ring member or placed within one of the plurality of compartments; and an agent container comprising a neutralizing agent, wherein the agent container is a package, cartridge, capsule, or pouch comprising the neutralizing agent, wherein the agent container is connected to the ring member or placed within one of the plurality of compartments.

16. The dispenser of claim 15, further comprising:

a force sensor configured to sense a trigger condition and contained in the housing;

a spring contained in the housing;

a lever device connected to a side surface of the housing and configured to hold the spring in a compressed position; and a control circuit connected to the force sensor and to the lever device, wherein upon occurrence of a trigger condition, the control circuit is configured to detect the trigger condition and actuate the lever device so as to release the spring from the compressed position.

17. The dispenser of claim 16, wherein after release of the spring from the compressed position, the spring is configured to exert a crushing force against the first plate so as to move the plurality of teeth into the plurality of compartments and to: i) crush the one or more units of the controlled substance, ii) push or release the adhesive from the adhesive container inside the housing to cover at least a portion of the crushed units of the controlled substance inside the housing, and iii) push or release the neutralizing agent from the agent container inside the housing to an interior of the housing, to an outside of the housing, or both to the interior and to the outside of the housing.

18. The dispenser of claim 16, further comprising:

a spring guide connected to the first plate, wherein the spring guide is positioned within the spring.

19. A dispenser configured to render one or more units of a controlled substance contained therein non-consumable, wherein the dispenser comprises:

a housing;

a first plate contained in the housing;

a plurality of teeth connected to the first plate;

a ring member contained in the housing and having a plurality of compartments;

a second plate, wherein the ring member is positioned between the first plate and the second plate, wherein each of the plurality of teeth is configured to fit within one of the plurality of compartments, wherein each of the one or more units of the controlled substance is in one of the plurality of compartments; and an adhesive container comprising an adhesive, wherein the adhesive container is a package, cartridge, capsule, or pouch comprising the adhesive, wherein the adhesive container is connected to the ring member or placed within one of the plurality of compartments.

20. The dispenser of claim 19, further comprising a motor assembly connected to the second plate and to the ring member, configured to rotate the ring member to align one of the plurality of compartments with an opening formed in the housing.

21. A dispenser configured to render one or more units of a controlled substance contained therein non-consumable, wherein the dispenser comprises:

a housing;

a first plate contained in the housing;

a plurality of teeth connected to the first plate;

a ring member contained in the housing and having a plurality of compartments;

a second plate, wherein the ring member is positioned between the first plate and the second plate, wherein each of the plurality of teeth is configured to fit within one of the plurality of compartments, wherein each of the one or more units of the controlled substance is in one of the plurality of compartments; and an agent container comprising a neutralizing agent, wherein the agent container is a package, cartridge, capsule, or pouch comprising the neutralizing agent, wherein the agent container is connected to the ring member or placed within one of the plurality of compartments.

22. The dispenser of claim 21, further comprising a motor assembly connected to the second plate and to the ring member, configured to rotate the ring member to align one of the plurality of compartments with an opening formed in the housing.

* * * * *